July 3, 1962
C. A. RAY
3,041,738
FEED DEVICE FOR DEHYDRATING MACHINE
Filed Dec. 19, 1958
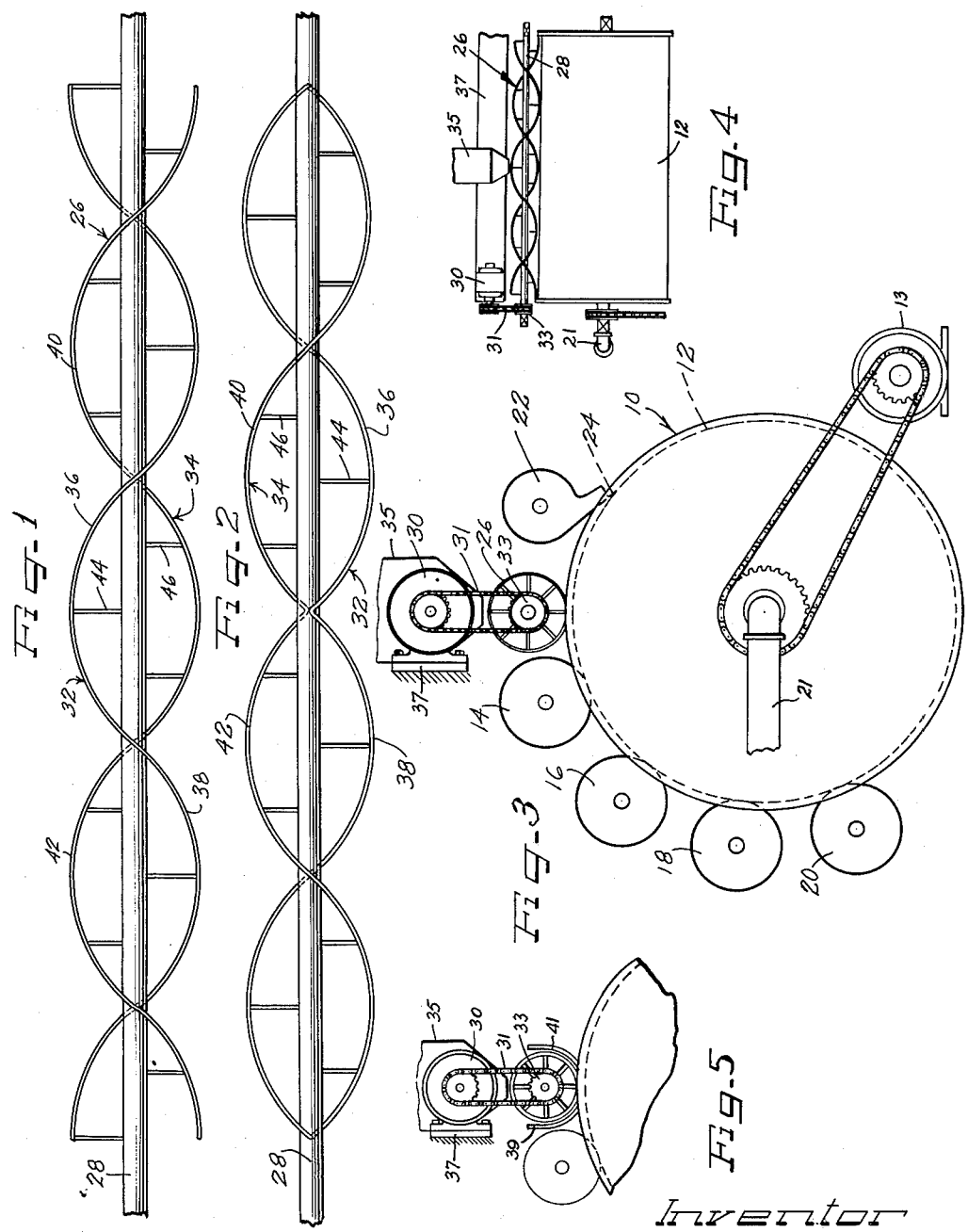
Inventor
Chester A. Ray

United States Patent Office 3,041,738
Patented July 3, 1962

3,041,738
FEED DEVICE FOR DEHYDRATING MACHINE
Chester A. Ray, Allegan, Mich., assignor to Overton Machine Company, a corporation
Filed Dec. 19, 1958, Ser. No. 781,663
12 Claims. (Cl. 34—112)

This invention relates to a feed device for a dehydrating machine, and more particularly to a method and apparatus wherein a helical spiral is adapted to distribute a food product such as mashed potatoes from the center portion of a drying drum laterally to both ends of the drum and to move the mash forwardly on the drum in the direction of the rotation of the drum to a series of spreader rollers.

A basic problem in the processing and drying of mashed potatoes and similar products is a tendency of the starch cells to rupture as the result of shearing contact with flat metal surfaces. The present invention resolves this problem by means of a rotating helical spiral which uses the mass of mashed potatoes as a moving medium. The helical spiral of the invention comprises a shaft adapted to be driven by sprocket or gear means in synchronized relation to the drying drum and a pair of spiral rods extending in right and left hand directions from a central portion of the shaft which are supported by pins in predetermined spaced relation to the shaft. Thus when the mash is fed to the feed spiral of the invention at the center portion thereof, it will be distributed laterally toward the ends of the drum with the spiral rods and the supporting pins affording a sufficient engagement with the mash to move the mash forwardly in the direction of rotation of the drum to the series of spreader rollers. If overfeeding occurs the mash will not overflow the end dams of the dryer but will be returned by the spiral toward the center thereof. After the mash has passed from the spreader rollers and been rotated for a major circumferential portion of the drum, it is removed by a doctor bar and knife of conventional construction.

Accordingly, it is an object of the present invention to provide a feed mechanism which includes a feed spiral adapted to move a mass of plastic, cohesive food material such as mashed potatoes or the like, into a series of spreader rolls rotated by a drying drum while distributing the mash laterally without a shearing action such as would damage the product.

Another object of the invention is to provide a feed mechanism as described having a feed spiral comprising a pair of double spiral rods, each of the rods having left and right hand portions turning in opposite directions and spaced from one another and from the shaft supporting them by supporting pins which cooperate with the rods in moving the mash.

Another object of the invention is to provide a feed spiral as described wherein the mass of mashed potatoes acts as a moving medium in co-operation with the spiral and a minimum of metal surfaces is provided so that rupture of cells in the mash is substantially eliminated.

Another object of the invention is to provide a feed spiral as described which will feed the mass of potatoes laterally from a central point in the spiral but will prevent overflow of the mass when overfeeding occurs by feeding the mass in a reverse direction toward the center at such time.

Other objects and advantages of the invention will become apparent as the description proceeds in accordance with the drawings in which:

FIGURE 1 is a front elevational view of a feed spiral according to the present invention;

FIGURE 2 is a similar view of a feed spiral according to the invention rotated 90° toward the viewer;

FIGURE 3 is an end elevational view of the feed spiral shown in FIGURES 1 and 2 together with drying mechanism combined therewith according to the invention;

FIGURE 4 is a front elevational view, of reduced size, of the structure shown in FIGURE 3; and FIGURE 5 is a view, broken away, of a second embodiment of the spiral and drying mechanism structure shown in FIGURE 3.

Referring now to FIGURE 3, a drier mechanism 10 for drying cohesive, viscose materials such as mashed potatoes or the like is shown which comprises a drying drum 12 which may be rotated by a conventional power unit 13. A plurality of spreader rolls 14, 16, 18 and 20 are journalled in tangential and sequential relationship around the drum 12 for rotation thereby, the drum and the spreader rolls being supported by suitable bearing means in accordance with the understanding of those skilled in the art. Thus, in the example shown, the drum rotates in a counterclockwise direction, and the spreader rolls are rotated in a clockwise direction during the operation of the drier mechanism 10. The drum 12 is heated by suitable means such as a steam conduit 21 so that the food materials or the like may be dehydrated as they pass therearound, and a doctor bar 22 and associated knife 24 of conventional construction are suitably positioned relative to the drum 12 so as to scrape the food product from the drum after the drying process has been completed.

In order to apply a continuous layer of mashed potatoes to the drum for introduction to the series of spreader rollers 14 through 20, a feed spiral 26 is provided in accordance with the invention which comprises a flight shaft 28 journalled in suitable bearing means and adapted to be driven as by suitable pulley means 30 and belt means 31 entrained around the pulley means 30 and a pulley 33 in synchronized relationship with the drum 12, and a pair of round rod spirals 32 and 34 each having right and left hand helical portions 36 and 38 and 40 and 42 respectively proceeding from a center point on the feed spiral and supported by radial pins such as the pins 44 and 46 respectively. The double spiral rods 32 and 34 and the pins 44 and 46 are preferably rounded and have a sufficient thickness to cooperate with a mass of potatoes in moving the mass laterally and forwardly, as hereinafter described, and the pins are of equal length so as to maintain the rods in predetermined equally spaced relation to the shaft 28. Each of the rods 32 and 34 defines a point of inflection between the right and left hand portions thereof, and the pins 44 and 46 for the respective rods are displaced angularly from one another to define the said double helical configuration of the rods, preferably being spaced axially a distance corresponding to 90° intervals of angular displacement. The spirals 32 and 34 are preferably displaced 180° from one another as shown.

The height or axial dimension of the pins 44 and 46 and the corresponding spacing of the rods 32 and 34 from the shaft 28 and the angular and axial spacing of the pins permits the feed spiral 26 to utilize the mass of mashed potatoes fed thereto as a moving medium, the cohesiveness of the mass moving it forwardly as a unit onto the drum. Thereby, the need for flat metal surfaces such as heretofore have been required is eliminated and the rupture of starch cells in the potatoes is reduced to an absolute minimum.

The mass of potatoes is fed by hopper means 35 which may be mounted on a motor support board or structure 37, to the central portions of the feed spiral 26 in the neighborhood of the points of inflection of the spirals 32 and 34. The spirals are spaced a predetermined distance from the surface of the drum 12 at their points of nearest approach thereto such that they cooperate with the drum in forming in effect right and left hand worm gears. Thus the mass of potatoes is moved laterally from the center portion of the drum to the ends, and the spacing of the spiral rods 32 and 34 from the drum prevents contact of any metal surfaces which would cause a shearing and rupture of the starch cells of the mash. Since the feed spiral 26 is rotated in the direction opposite to the direction of rotation of the drum, the potatoes are fed in the direction of rotation of the drum toward the nip of the first spreader roll 14, with the cohesiveness of the mass maintaining the movement thereof onto the drum. As seen in FIGURE 5, arcuate guards 39 and 41 may be provided extending in surrounding relationship along the sides of the spiral 26 and open at the top and bottom to afford the said movement of the mass onto the drum. However, the said cohesiveness and viscosity of the mass will afford the forward and lateral movement of the potatoes without such guards. Thus as the mass comes into contact with the drum, the rods 32 and 34 respectively as guides so that the relative movement provided by the drum is directed into a component of lateral movement also.

In the event of overloading of the feed spiral 26, the double helical construction of the rods 32 and 34 precludes any tendency of the mash to overfow the end dams of the drum, such as the end drum diagrammatically indicated at 48, and instead, the mash will be returned toward the center of the feed spiral. By thus filling from the back end into the center of the drum, the overload is contained within the spiral 26. When the mash is thereafter distributed, the geometrical characterisitcs of the spiral render it self-cleaning.

There has thus been provided a feed spiral for a dehydrating device which is adapted to eliminate excessive crushing and rupturing of starch cells in mashed potatoes distributed thereby and which is also effective to prevent spilling as the result of overloading of the spiral. The spiral is self-adjusting in the sense that even upon overload the mass is distributed evenly therethrough and is self-cleaning so that it is automatically conditioned for further processing of food after distribution has been accomplished. The feed spiral of the invention is adapted for use in a wide variety of applications, and variations of the spacing of the rods from one another and in the spacing and axial dimensions of the pins supporting the rods may render the device suitable for feeding cohesive materials in a fairly wide range of viscosity or plasticity.

Although I have herein set forth and described my invention with respect to certain specific principles and details thereof, it will be understood by those skilled in the art that these may be varied without departing from the spirit and scope of the invention as set forth in the hereunto appended claims.

I claim as my invention:

1. A machine adapted for dehydrating a cohesive, viscous food material or the like comprising a drier drum, means for rotating said drier drum, a feed spiral and means for rotating said feed spiral, said drier drum and said feed spiral being mounted for rotation on parallel axes and said feed spiral being in radially proximate relation to the drier drum and configured to distribute the food material or the like onto the drum laterally from the center of the feed spiral with said feed spiral and said drum coacting to move the food material or the like with the food material acting as a moving medium therebetween.

2. A machine adapted for dehydrating a cohesive, viscous food material or the like comprising a drier drum, means for rotating said drier drum, a feed spiral, means for rotating said feed spiral, said drier drum and said feed spiral being mounted for rotation on parallel axes and said feed spiral being in radially proximate relation to the drier drum and configured to distribute the food material or the like onto the drum laterally from the center of the feed spiral with said feed spiral and said drum coacting to move the food material or the like with the food material acting as a moving medium therebetween, and spreader roll means mounted substantially tangentially with said drier drum and in position to receive the food material distributed on said drier drum by said drier drum and said feed spiral, for effecting further distribution thereof.

3. In a dehydrating apparatus for cohesive, viscous food materials or the like having a drier drum, means for rotating said drier drum, a feed spiral, means for driving said feed spiral in radially proximate relation to said drier drum such as to cause the feed spiral and the drier drum to cooperate in moving the materials forwardly along the drier drum, the feed spiral comprising a shaft, a plurality of double helical rods and means supporting each of said rods, said double helical rods each turning in one angular direction from the center of the feed spiral to one end thereof and in the other angular direction from the center of the feed spiral to the other end thereof whereby the drum and the spiral during rotation thereof coact in spreading the materials laterally from the center of the spiral.

4. In a dehydrating apparatus for cohesive, viscous food materials or the like having a drier drum, means for rotating said drier drum, a feed spiral, means for driving said feed spiral in radially proximate relation to said drier drum such as to cause the feed spiral and the drier drum to cooperate in moving the materials forwardly along the drier drum, the feed spiral comprising a shaft, a plurality of double helical rods, means supporting each of said rods, said double helical rods each turning in one angular direction from the center of the feed spiral to one end thereof and in the other angular direction from the center of the feed spiral to the other end thereof whereby the drum and the spiral during rotation thereof coact in spreading the materials laterally from the center of the spiral, and spreader roll means journalled in contiguous relation to the drier drum to receive materials spread by the drier drum and the feed spiral and effect further distribution along the drier drum.

5. In a dehydrating machine, a feed spiral for distributing cohesive, viscous food material or the like onto a drier drum of the machine, said feed spiral comprising a shaft, a helical rod turning from the center thereof in one angular direction toward one end of the shaft and turning from the center thereof in another angular direction toward the other end of the shaft, and means supporting the rod in uniformly radially spaced relationship to the shaft.

6. In a dehydrating device, a feed spiral for distributing cohesive, viscous food material or the like onto a drier drum of the machine, said feed spiral comprising a shaft, a plurality of helical rods turning from the centers thereof in one angular direction toward one end of the shaft and turning from the centers thereof in another angular direction toward another end of the shaft, and means supporting each of the rods in uniformly radially spaced relationship to the shaft, said rods being equally radially spaced from the shaft.

7. A feed spiral for distributing cohesive, viscous food materials or the like onto the drier drum of a dehydrating machine or the like, said feed spiral comprising an elongated shaft, a pair of helical rods and means supporting said pair of helical rods in uniformly radially spaced relation to the shaft for the full length of each of the rods, and in equally radially spaced relation to the shaft, each of said rods turning in one angular direction from the center thereof toward one end of the shaft and in another angular direction from the center thereof toward another end of the shaft, the centers of said rods being disposed on opposite sides of the shaft and in diametrical alignment.

8. A feed spiral for distributing cohesive, viscous food materials or the like onto the drier drum of a dehydrating machine or the like, said feed spiral comprising an elongated shaft, a pair of helical rods, and means supporting said pair of helical rods in uniformly radially spaced relation to the shaft for the full length of each of the rods and in equally radially spaced relation to the shaft, each of said rods turning in one angular direction from the center thereof toward one end of the shaft and in another angular direction from the center thereof toward another end of the shaft, the centers of said rods being disposed on opposite sides of the shaft in diametrical alignment, said means supporting said rods including a plurality of radially extending pins of uniform length mounted on the shaft and connected to the rods and said pins being spaced axially along said shaft and coacting with the rods to engage the mass of food material to be distributed.

9. In a dehydrating machine having a drum and means for rotating said drum, a feed spiral, means for rotating the feed spiral, said feed spiral and said drum being mounted in proximately radially spaced relationship such as to cooperate when driven in distributing the food materials along the drum, the drum effecting a lateral distribution of the food material therealong in cooperation with the feed spiral, said feed spiral comprising a shaft, a plurality of helical rods turning from the center thereof in one angular direction toward one end of the shaft and turning from the center thereof in another angular direction on the shaft toward another end of the shaft, and means supporting each of the rods in uniformly radially spaced relationship to the shaft, said rods being equally radially spaced from the shaft.

10. In a dehydrating machine, for food materials and the like, having a drum and means for rotating said drum, a feed spiral, means for rotating the feed spiral, said feed spiral and said drum being mounted in proximately radially spaced relationship such as to cooperate when driven in distributing the food materials along the drum, the drum effecting a lateral distribution of the food material therealong in cooperation with the feed spiral, said feed spiral comprising a shaft, a plurality of helical rods, and means supporting each of the rods in uniformly radially spaced relationship to the shaft.

11. In a dehydrating machine having a drier drum, a feed spiral, means journalling said feed spiral and said drier drum in radially proximate relationship means for driving said feed spiral and means for driving said drier drum, said feed spiral comprising an elongated shaft, a pair of helical rods, and means supporting said pair of helical rods in uniformly radially spaced relation to the shaft for the full length of each of rods and in equally spaced relation to the shaft, each of said rods turning in one angular direction from the center thereof toward one end of the shaft and in another angular direction from the center thereof toward another end of the shaft, the centers of said rods being disposed on opposite sides of the shaft in diametrical alignment, said means supporting said rods including a plurality of radially extending pins of uniform length mounted on the shaft and connected to the rods and said pins being spaced axially along said shaft and coacting with the rods to engage the mass of food material to be distributed.

12. In a dehydrating machine having a drier drum, a feed spiral, means journalling said feed spiral, and said drier drum in radially proximate relationship means for driving said feed spiral and means for driving said drier drum, said feed spiral comprising an elongated shaft, a pair of helical rods, and means supporting said pair of helical rods in uniformly radially spaced relation to the shaft for the full length of each of the rods and in equally radially spaced relation to the shaft, each of said rods turning in one angular direction from the center thereof toward one end of the shaft and in another angular direction from the center thereof toward another end of the shaft, the centers of said rods being disposed on opposite sides of the shaft in diametrical alignment, said means supporting said rods including a plurality of radially extending pins of uniform length mounted on the shaft and connected to the rods and said pins being spaced axially along said shaft and coacting with the rods to engage the mass of food material to be distributed, the pins for each of said rods being each substantially 90° angularly displaced from the next adjacent pins for the rod.

References Cited in the file of this patent

UNITED STATES PATENTS

| | | |
|---|---|---|
| 135,999 | Moseley | Feb. 18, 1873 |
| 2,102,607 | Baker | Dec. 21, 1937 |
| 2,182,680 | Rugg | Dec. 5, 1939 |
| 2,515,455 | Lipton | July 18, 1950 |
| 2,712,154 | Lindquist | July 5, 1955 |
| 2,847,196 | Franklin | Aug. 12, 1958 |

FOREIGN PATENTS

| | | |
|---|---|---|
| 147,597 | Australia | July 30, 1952 |